United States Patent
Katti et al.

(10) Patent No.: US 8,854,870 B2
(45) Date of Patent: Oct. 7, 2014

(54) MAGNETORESISTIVE RANDOM ACCESS MEMORY (MRAM) DIE INCLUDING AN INTEGRATED MAGNETIC SECURITY STRUCTURE

(75) Inventors: Romney R. Katti, Shorewood, MN (US); James L. Tucker, Clearwater, FL (US); Anuj Kohli, Apple Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 4 days.

(21) Appl. No.: 13/419,066

(22) Filed: Mar. 13, 2012

(65) Prior Publication Data

US 2013/0242646 A1     Sep. 19, 2013

(51) Int. Cl.
*G11C 11/00* (2006.01)

(52) U.S. Cl.
USPC ........................................... 365/158; 365/173

(58) Field of Classification Search
USPC ................................................. 365/158, 173
See application file for complete search history.

(56) References Cited

U.S. PATENT DOCUMENTS

| | | | |
|---|---|---|---|
| 5,902,690 A | 5/1999 | Tracy et al. |
| 6,264,108 B1 | 7/2001 | Baentsch |
| 6,914,805 B2 | 7/2005 | Witcraft et al. |
| 7,005,733 B2 | 2/2006 | Kommerling et al. |
| 7,180,008 B2 | 2/2007 | Heitmann et al. |
| 7,224,634 B2 | 5/2007 | Lenssen et al. |
| 7,468,664 B2 | 12/2008 | Daughton et al. |
| 7,485,976 B2 | 2/2009 | Knudsen |
| 7,489,015 B2 | 2/2009 | Stobbs |
| 7,615,416 B1 | 11/2009 | Chock |
| 7,685,438 B2 | 3/2010 | Knudsen |
| 7,712,147 B2 | 5/2010 | Lenssen et al. |
| 7,978,070 B2 | 7/2011 | Hunter |
| 8,167,057 B2 | 5/2012 | Gabelich |
| 8,172,140 B2 | 5/2012 | Bartley et al. |
| 8,261,367 B2 | 9/2012 | Lenssen et al. |
| 8,294,577 B2 | 10/2012 | Deak |
| 2004/0032010 A1 | 2/2004 | Kools et al. |
| 2008/0247098 A1 | 10/2008 | Deak |
| 2010/0050275 A1 | 2/2010 | Burch et al. |
| 2010/0110783 A1* | 5/2010 | Liu et al. ........................ 365/171 |

OTHER PUBLICATIONS

"Philips Self-Destructing MRAM on the Way", downloadable from http://www.bizasia.com/technology_/de8a4/philips_self_destructing_mram.htm, 2 pages, dowloaded on Sep. 8, 2011.
Office Action from U.S. Appl. No. 13/419,109, dated Nov. 29, 2013, 10 pp.
Response to Office Action dated Mar. 13, 2012, from U.S. Appl. No. 13/419,109, filed Feb. 26, 2014, 9 pp.
Notice of Allowance from U.S. Appl. No. 13/419,109, mailed Apr. 14, 2014, 7 pp.

* cited by examiner

*Primary Examiner* — Michael Tran
(74) *Attorney, Agent, or Firm* — Shumaker & Sieffert, P.A.

(57) ABSTRACT

An MRAM die may include a first write line, a second write line, an MRAM cell disposed between the first write line and the second write line, and a magnetic security structure adjacent to the MRAM cell. The magnetic security structure may include a permanent magnetic layer and a soft magnetic layer.

20 Claims, 9 Drawing Sheets

MAGNETORESISTIVE RANDOM ACCESS MEMORY (MRAM) DIE INCLUDING AN INTEGRATED MAGNETIC SECURITY STRUCTURE

TECHNICAL FIELD

The disclosure relates to magnetoresistive random access memory (MRAM), and, more particularly, to anti-tampering devices for MRAM.

BACKGROUND

MRAM is a non-volatile memory technology in which data are stored using magnetic domains. Because MRAM is non-volatile, the data stored in the magnetic domains is maintained without requiring power to continually refresh the magnetic domains. Additionally, MRAM may provide desirable read speeds, write speeds, and device longevity. Because of these characteristics, MRAM may be used in a variety of applications, such as long-term storage (e.g., in place of or as a complement to a hard disc drive or a solid state drive), or device memory (e.g., in place of or as a complement to dynamic random access memory (DRAM) and/or static random access memory (SRAM)).

SUMMARY

In general, the disclosure is directed to techniques and MRAM dice for reducing or substantially preventing tampering with MRAM devices. In some examples, an MRAM die may include a magnetic security structure incorporated into the MRAM die. The magnetic security structure may include at least two layers of magnetic material. For example, the magnetic security structure may include a permanent magnetic layer and a keeper (also referred to herein as a "soft") magnetic layer disposed next to the permanent magnetic layer. When the soft magnetic layer is intact (e.g., not damaged), the soft magnetic layer may channel magnetic flux from the permanent magnetic layer. This may prevent the magnetic flux from the permanent magnetic layer from influencing the magnetic orientations of free magnetic layers in MRAM cells in the MRAM die. However, when the soft magnetic layer is damaged, such as when the MRAM die is tampered with, the soft magnetic layer may not channel magnetic flux from the permanent magnetic layer, and the magnetic flux may affect magnetic orientations of free magnetic layers in MRAM cells in the MRAM die. The magnetic flux from the permanent magnetic layer may modify the magnetic orientation of free magnetic layers in at least some MRAM cells, thus changing the data stored on the MRAM die. In this way, the magnetic security structure may help prevent access to the data stored on the MRAM die when the MRAM die is tampered with.

In one aspect, the disclosure is directed to an MRAM die that includes a first write line, a second write line, an MRAM cell disposed between the first write line and the second write line, and a magnetic security structure adjacent to the MRAM cell. In accordance with this aspect of the disclosure, the MRAM cell includes a free magnetic layer, a fixed magnetic layer, and a tunnel barrier layer disposed between the free magnetic layer and the fixed magnetic layer. Also according to this aspect of the disclosure, the magnetic security structure includes a permanent magnetic layer and a soft magnetic layer.

In another aspect, the disclosure is directed to an MRAM die that includes a plurality of MRAM cells, where each of the MRAM cells includes a free magnetic layer, a fixed magnetic layer, and a tunnel barrier layer disposed between the free magnetic layer and the fixed magnetic layer. In accordance with this aspect of the disclosure, the MRAM die also includes a magnetic security structure adjacent to at least one of the MRAM cells, and the magnetic security structure comprises a permanent magnetic layer and a soft magnetic layer.

In a further aspect, the disclosure is directed to a method that includes forming a magnetic stack comprising a fixed magnetic layer, a tunnel barrier layer, and a free magnetic layer in a magnetoresistive random access memory (MRAM) die and forming in the MRAM die a magnetic security structure adjacent to the magnetic stack. In accordance with this aspect of the disclosure, the magnetic security structure comprises a permanent magnetic layer and a soft magnetic layer.

The details of one or more examples are set forth in the accompanying drawings and the description below. Other features, objects, and advantages will be apparent from the description and drawings, and from the claims.

DETAILED DESCRIPTION

Figure 1A:
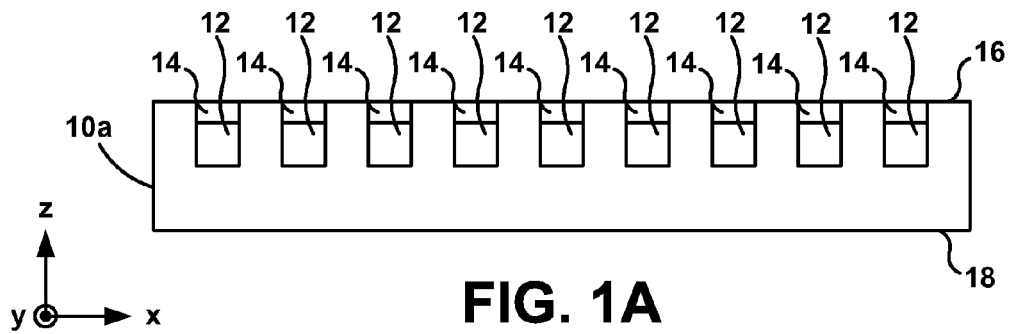
FIGS. 1A-1E are conceptual and schematic cross-sectional diagrams that illustrate example MRAM dies that include magnetic security structures.

In general, the disclosure is directed to techniques, MRAM dice, and assemblies including the MRAM dice for reducing or substantially preventing tampering with MRAM devices. In some examples, an MRAM die may include a magnetic security structure incorporated into the MRAM die. Incorporating the magnetic security structure into the MRAM die may complicate removal of the magnetic security structure from the MRAM die without affecting data stored by the MRAM die, e.g., compared to a magnetic security structure that is separate from the MRAM die. The magnetic security structure may include at least two layers of magnetic material. For example, the magnetic security structure may include a permanent magnetic layer and a keeper (or soft) magnetic layer disposed next to the permanent magnetic layer. When the soft magnetic layer is substantially intact (e.g., not damaged), the soft magnetic layer may channel (e.g., direct) magnetic flux from the permanent magnetic layer. This may prevent the magnetic flux from the permanent magnetic layer from interfering with the magnetic orientations of free magnetic layers in MRAM cells in the MRAM die.

However, when the soft magnetic layer is damaged or otherwise physically altered, such as when the MRAM die is physically tampered with, the soft magnetic layer may not channel magnetic flux from the permanent magnetic layer, and, as a result, the magnetic flux may affect the magnetic orientations of free magnetic layers in the MRAM cells in the MRAM die. Damaging the soft magnetic layer may include, for example, removing at least part of the soft magnetic layer, marring the soft magnetic layer, tearing the soft magnetic layer, puncturing the soft magnetic layer, or otherwise changing physical or magnetic properties of the soft magnetic layer. When the soft magnetic layer is damaged, the magnetic flux from the permanent magnetic layer may modify the magnetic orientation of at least some free magnetic layers in the MRAM cells, thus changing the data stored on the MRAM die. By changing the data stored on the MRAM die, access to the original data (e.g., data stored on the MRAM die before tampering) may be made more difficult or may be prevented. Protection of data stored by the MRAM die with the magnetic security structure in this manner may be useful if, for example, the MRAM die stores confidential information, such as classified information to which access is restricted by law or regulation to particular groups of persons or other intellectual property of an individual or entity.

FIGS. 1A-1E are conceptual and schematic cross-sectional diagrams that illustrate example MRAM dice 10a-10e (collectively, "MRAM dice 10") in accordance with aspects of the disclosure. In some examples, each MRAM die 10a-10e may be an individual integrated circuit. Each of MRAM dice 10 includes a plurality of MRAM cells 12. Although FIGS. 1A-1E each show only one cross-sectional view of the respective one of MRAM dice 10, and hence show MRAM cells 12 extending along one direction (e.g., the x-axis shown in FIGS. 1A-1E, where orthogonal x-y-z axes are shown in FIGS. 1A-1E for ease of description only), each of MRAM dice 10 may include a two- or three-dimensional array of MRAM cells 12 (e.g., MRAM cells 12 may be arrayed in a layer parallel to the x-y plane shown in FIGS. 1A-1E).

Although not shown in FIGS. 1A-1E, one or more MRAM dice 10 may be disposed in an MRAM package. In some implementations, an MRAM package includes a substrate and a cover. The cover may be attached to the substrate, and, together, the substrate and the cover can define a cavity. One or more MRAM dice 10 may be disposed in the cavity. In this way, the MRAM package may enclose one or more MRAM dice 10. In some examples, the substrate and the cover define a substantially fully enclosed cavity. In other examples, the substrate and the cover may define a partially enclosed cavity. In some instances in which the substrate and the cover define a substantially fully enclosed cavity, the substrate and the cover may form a hermetic enclosure around one or more MRAM dice 10.

The substrate of the MRAM package may include at least one electrically conductive trace between an internal surface of the MRAM package and an external surface of the MRAM package. One or more of MRAM dice 10 may be electrically connected to the at least one electrically conductive trace. In this way, the one or more MRAM dice 10 disposed within the MRAM package may electrically communicate with circuitry outside of the MRAM package. For example, the MRAM package may be attached to a printed board.

MRAM cells 12 are the individual structures that are configured to store data magnetically in MRAM die 10. For example, each of MRAM cells 12 may include a fixed magnetic layer, a tunnel barrier layer, and a free magnetic layer (shown in, e.g., FIG. 2A). An orientation of the magnetic moment of the fixed magnetic layer is fixed at the temperatures and external magnetic fields in which MRAM dice 10 are designed for use. The orientation of the magnetic moment of the free magnetic layer may be switched by between two states, each state representing a bit (e.g., a 0 or 1). In some implementations, MRAM dice 10 may utilize one or more write lines disposed near each of MRAM cells 12 to switch the orientation of the free magnetic layer of the respective one of MRAM cells 12 by applying a magnetic field to the free magnetic layer. In other implementations, MRAM dice 10 may utilize write lines electrically connected to respective ones of the MRAM cells 12 to conduct a spin-polarized current through one of MRAM cells 12 to write data to the respective one of MRAM cells 12 (e.g., in a spin-transfer torque (STT)-MRAM die). In either implementation, the orientation of the magnetic moment of the free magnetic layer, and, thus, the value of the bit stored in the respective one of MRAM cells 12, may be read by measuring an electrical resistance of the respective one of MRAM cells 12. For example, a higher measured electrical resistance may correspond to a logical state of "1," while a lower measured electrical resistance may correspond to a logical state of "0."

Each of MRAM dice 10 also includes at least one magnetic security structure 14 integrated into the respective one of MRAM dice 10 and disposed adjacent to (e.g., near) at least one of MRAM cells 12. For example, FIG. 1A illustrates an example MRAM die 10a that includes a magnetic security structure 14 for each of MRAM cells 12. In the example illustrated in FIG. 1A, each of the plurality of magnetic security structures 14 is disposed between MRAM cells 12 and first surface 16 of MRAM die 10a. In some examples, first surface 16 of MRAM die 10a may be referred to as a front side of MRAM die 10a. In addition, in some examples, first surface 16 of MRAM die 10a may be substantially planar. However, first surface 16 of MRAM die 10a may not be substantially planar in other examples.

Figure 1B:
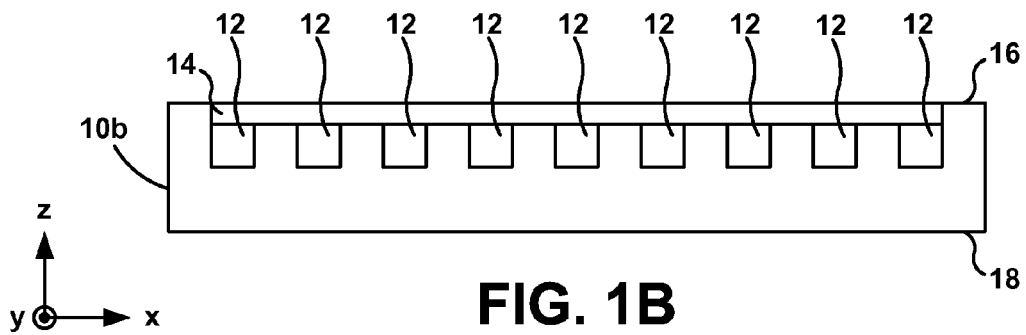

In other examples, an MRAM die 10 may include a greater or a fewer number of magnetic security structures 14 than one magnetic security structure 14 for each of MRAM cells 12. For example, an MRAM die 10 may include a magnetic security structure 14 that extends adjacent to at least two of the plurality of MRAM cells 12. For example, as shown in FIG. 1B, an MRAM die 10b may include a single magnetic security structure 14 that extends discontinuously adjacent to substantially all of the plurality of magnetic security structures 14. In some examples, magnetic security structure 14 may extend substantially continuously in the direction of the x-axis and/or the direction of the y-axis of FIG. 1B. In other examples, magnetic security structure 14 may be discontinuous along at least one direction (e.g., the x-axis direction and/or the y-axis direction).

Figure 1C:
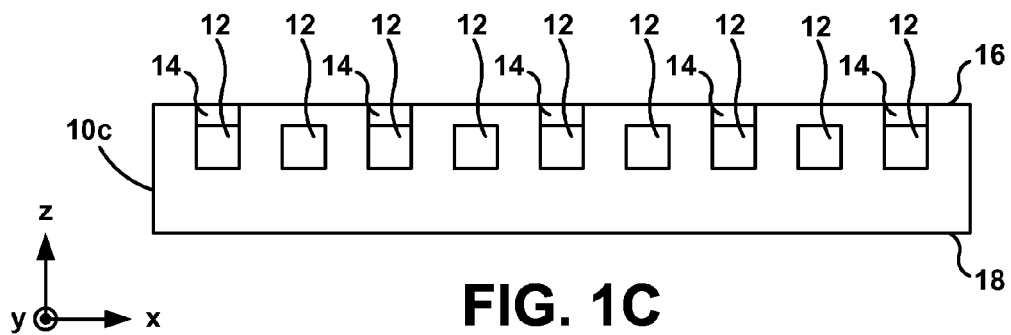

FIGS. 1A and 1B illustrate MRAM die 10 as including a magnetic security structure 14 adjacent to each of MRAM cells 12 of the respective die 10 or at least aligned on the plane shown in the cross-sectional view of FIGS. 1A and 1B. However, in other examples, MRAM die 10 may not include a magnetic security structure 14 adjacent to each of MRAM cells 12, and may include magnetic security structures 14 adjacent to only some of MRAM cells 12 of the respective die 10. For example, FIG. 1C illustrates an implementation in which MRAM die 10c includes magnetic security structures 14 adjacent to every other one of MRAM cells 12 aligned in one plane. In other examples, MRAM die 10 may include any number of magnetic security structures 14 (e.g., at least one magnetic security structure 14) and the at least one magnetic security structure 14 may be disposed adjacent to any number of MRAM cells 12 (e.g., at least one of MRAM cells 12).

Figure 1D:
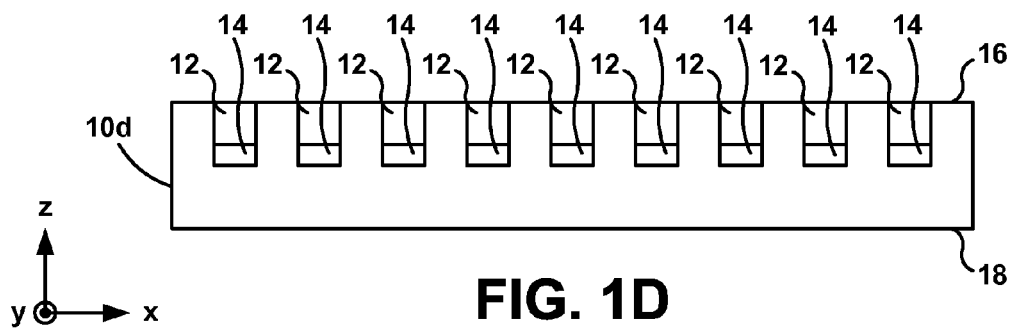

Although FIGS. 1A-1C illustrate examples in which MRAM die 10 includes magnetic security structures 14 disposed on a first side of MRAM cells 12 (e.g., the side between MRAM cells 12 and first surface 16 of MRAM die 10), in other examples, an MRAM die 10 may include magnetic security structures 14 disposed on a second side of MRAM cells 12 (e.g., the side between MRAM cells 12 and second surface 18 of MRAM cells 12). For example, FIG. 1D illustrates an MRAM die 10d in which magnetic security structures 14 are disposed only on the second side of MRAM cells 12. Although FIG. 1D shows one magnetic security structure 14 for each MRAM cell 12, in other examples, MRAM die 10 may include more or fewer magnetic security structures 14, as described with respect to FIGS. 1A-1C.

Figure 1E:
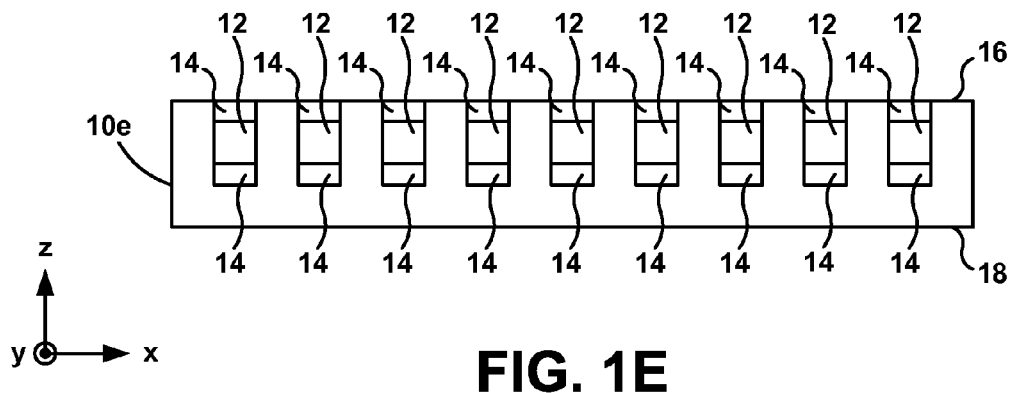

In some instances, as shown in FIG. 1E, an MRAM die 10e may include magnetic security structures 14 disposed on both the first side and the second side of MRAM cells 12. Although FIG. 1E illustrates MRAM die 10e as including two magnetic security structures 14 for each of MRAM cells 12, in other examples, MRAM die 10e may not include two magnetic security structures 14 for each of MRAM cells 12. For example, MRAM die 10e may include a single magnetic security structure 14 disposed on the first side of MRAM die 10e and/or a single magnetic security structure 14 disposed on the second side of MRAM die 10e. In some examples, the single magnetic security structure 14 may be similar to or substantially the same as magnetic security structure 14 shown in FIG. 1B. The single magnetic security structure 14 may extend adjacent to between one and substantially all of MRAM cells 12.

In other examples, MRAM die 10e may include fewer than two magnetic security structures 14 for each of MRAM cells 12, and MRAM die 10e may include, on the first side, magnetic security structures 14 adjacent to only some of MRAM cells 12 and/or, on the second side, magnetic security structures 14 adjacent to only some of MRAM cells 12. In some examples, MRAM die 10e may include, on the first side, magnetic security structures 14 adjacent to only some of MRAM cells 12. Continuing the example, MRAM die 10e may include, on the second side, magnetic security structures 14 adjacent to only some of MRAM cells 12, and none of MRAM cells 12 may have magnetic security structures 14 adjacent to the cell 12 on both the first side and the second side. Other configurations (e.g., arrangements) of MRAM cells 12 and magnetic security structures 14 are possible and fall within the scope of this disclosure.

Figure 2A:
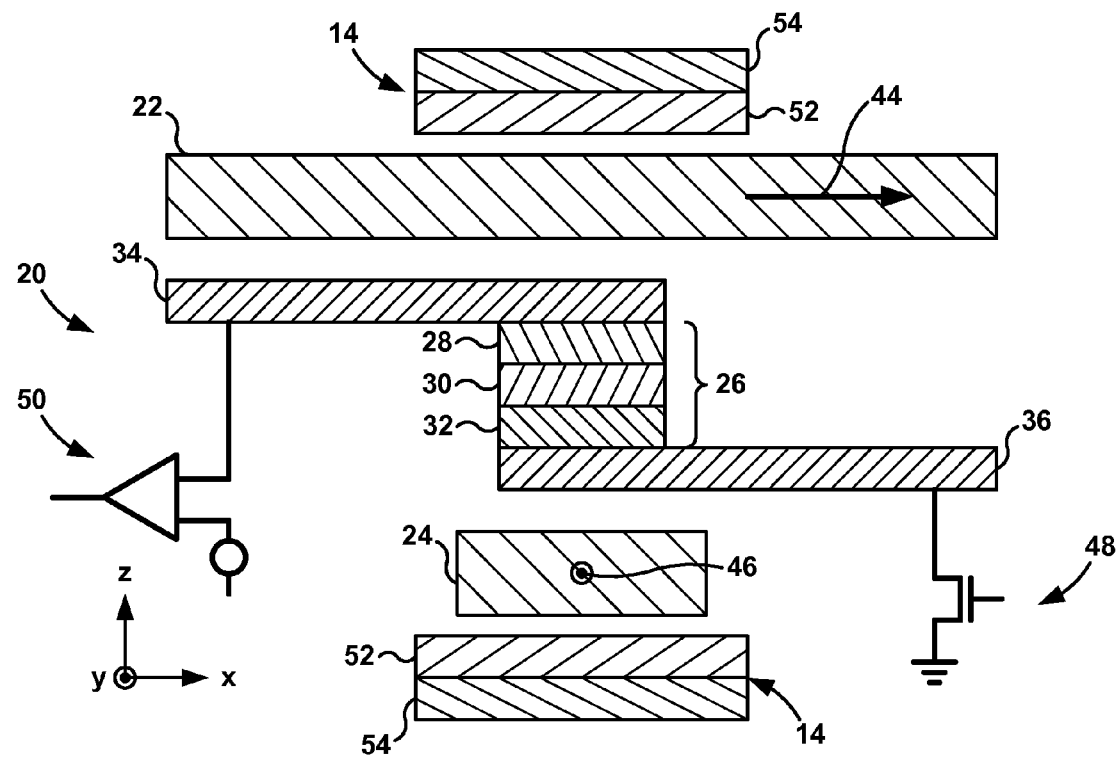
FIGS. 2A-2C are conceptual cross-sectional diagrams that illustrate an example MRAM cell and adjacent magnetic security structure.
Figure 2B:
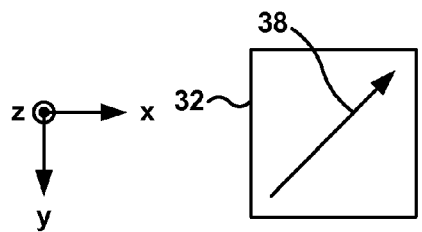
Figure 2C:
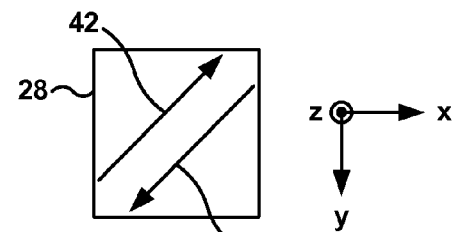

FIGS. 2A-2C are conceptual diagrams that illustrate MRAM cell 20, which may be an example of one or more (e.g., all) of the MRAM cells 12 shown in FIGS. 1A-1E. MRAM cell 20 includes a first write line 22 and a second write line 24, which are used to write data to MRAM cell 20. First write line 22 extends generally in the x-axis direction of FIG. 2A (orthogonal x-y-z axes are shown in FIG. 2A for ease of description only), while second write line 24 extends generally in the y-axis direction of FIG. 2A. MRAM cell 20 also includes a magnetic stack 26, which includes a free magnetic layer 28, a tunnel barrier layer 30, and a fixed magnetic layer 32. In some examples, magnetic stack 26 may be referred to as a magnetic tunnel junction (MTJ).

Tunnel barrier layer 30 may include a dielectric, such as an oxide. In some examples, tunnel barrier layer 30 may include aluminum oxide ($Al_2O_3$) or magnesium oxide (MgO).

Fixed magnetic layer 32 includes a pinned magnetic moment 38, illustrated in FIG. 2B. In the illustrated example, pinned magnetic moment 38 is oriented at an approximately 45 degree angle to first write line 22 and second write line 24 (e.g., approximately a 45 degree angle to both the x-axis and y-axis in FIG. 2B, where orthogonal x-y-z axes are shown in the figures for ease of description). In some examples, fixed magnetic layer 32 may include a ferromagnetic metal or alloy, such as, for example, Ni, Fe, or Co, or alloys of Ni, Fe, or Co. Example alloys from which fixed magnetic layer 32 can be formed include NiFe, CoFe, and NiFeCo. In some examples, fixed magnetic layer 32 may be magnetically coupled to an antiferromagnetic layer, which acts to pin the magnetic moment 66 of fixed magnetic layer. The antiferromagnetic layer may include an antiferromagnetic alloy, such as, for example, FeMn, NiMn, IrMn, or PtMn. In some examples, the antiferromagnetic layer may be a bilayer or multilayer, in which the layers have different compositions or magnetic properties.

Free magnetic layer 28 includes a free magnetic moment that is free to rotate under influence of a sufficiently strong applied magnetic field, as illustrated in FIG. 2C. In some examples, free magnetic layer 28 may include a ferromagnetic metal or alloy, such as, for example, Ni, Fe, or Co, or alloys of Ni, Fe, or Co. Example alloys from which free magnetic layer 28 can be formed include NiFe, CoFe, and NiFeCo.

For example, free magnetic layer 28 may have a first free magnetic moment 40 or a second free magnetic moment 42. Free magnetic layer 28 may be switched between first free magnetic moment 40 and a second free magnetic moment 42 by a sufficiently strong magnetic field, such as a magnetic field generated by first write line 22 and second write line 24 or a magnetic field generated by magnetic security device 14.

For example, the magnetic moment of free magnetic layer 28 may be switched between first free magnetic moment 40 and a second free magnetic moment 42 using first write line 22 and second write line 24. An applied magnetic field may be produced by pulses of electric current flowing through first write line 22 and second write line 24. Consider an example in which free magnetic moment begins with the orientation of first free magnetic moment 40. Electric current may be sent through second write line 24 in the direction indicated by arrow 46 (e.g., in the direction of the y-axis of FIG. 2A, out of the plane of the figure) and the magnetic moment of free magnetic layer 28 may rotate to be substantially parallel to arrow 44. While electric current still flows through second write line 24, current may be sent through first write line 22 in a direction indicated by arrow 44, bringing the free magnetic moment to a substantially 45 degree angle between arrows 44 and 46. Current flow through second write line 24 is then ceased, and the free magnetic moment of free magnetic layer 28 rotates to be substantially parallel to the direction of current flow through first write line 22, indicated by arrow 44. Finally, current flow through first write line 22 is ceased, and the free magnetic moment of free magnetic layer 28 rotates to be oriented in the direction indicated by second free magnetic moment 42.

The orientation of free magnetic moment 40, 42 relative to the orientation of pinned magnetic moment 38 determines the resistance of magnetic stack 26. For example, the resistance of magnetic stack 26 when pinned magnetic moment 38 and first free magnetic moment 40 are oriented substantially anti-parallel, is greater than the resistance of magnetic stack 26 when pinned magnetic moment 38 and second free magnetic moment 42 are oriented substantially parallel. In some examples, such as the one shown in FIG. 2A, the relative resistance of the magnetic stack 26 may be determined by flowing current from transistor 48 through bottom electrode 36 to magnetic stack 26, through top electrode 34 to op-amp 50, where the current is compared to a baseline or standard current. The relative resistance is the storage mechanism of MRAM cell 20. For example, a high resistance may correspond to a logical state of "1," while a low resistance may correspond to a logical state of "0."

FIG. 2A also illustrates magnetic security structures 14 disposed adjacent to MRAM cell 20. In the example of FIG. 2A, magnetic security structures 14 are disposed above first write line 22 and below second write line 24 (e.g., first write line 22 is between one of magnetic security structures 14 and MRAM cell 20 and second write line 24 is between one of magnetic security structures 14 and MRAM cell 20). In the example shown in FIG. 2A, a respective magnetic security structure 14 is disposed on both sides (e.g., above and below) MRAM cell 20. In other examples, a respective magnetic security structure 14 may not be disposed on both sides of MRAM cell 20, and a magnetic security structure 14 may be disposed on only one side of MRAM cell 20 (e.g., only above or only below MRAM cell 20). In various examples, magnetic security structures 14 may be disposed relative to MRAM cell 20 in any of the configurations described herein, e.g., with respect to FIGS. 1A-1E.

In the example illustrated in FIG. 2A, each magnetic security structure 14 includes a permanent magnetic layer 52 and a soft (or keeper) magnetic layer 54. As shown in FIG. 2A, in some examples, permanent magnetic layer 52 may be disposed between soft magnetic layer 54 and MRAM cell 20. In some implementations, this may result in soft magnetic layer 54 being disposed nearer a surface of the MRAM die of which MRAM cell 20 is part (e.g., first surface 16 or second surface 18 shown in FIGS. 1A-1E). This may increase a likelihood of soft magnetic layer 54 being damaged by tampering prior to permanent magnetic layer 52 being destroyed, thus increasing the likelihood that magnetic flux from permanent magnetic layer 52 will affect an orientation of the free magnetic moment of free magnetic layer 28. In other examples, soft magnetic layer 54 may be disposed between MRAM cell 20 and permanent magnetic layer 52.

Permanent magnetic layer 52 may be formed of any permanent magnetic material, such as, for example, ferrite, alnico (a combination of aluminum, nickel, cobalt, and iron, and, optionally, copper), or a rare earth magnetic material, such as samarium-cobalt or neodymium-iron-boron. Permanent magnetic layer 52 may be formed of a material and with a structure that causes permanent magnetic layer 52 to have a sufficiently high coercivity at expected use temperatures of MRAM cell 20 so that the magnetic moment of permanent magnetic layer 52 is substantially stable, e.g., does not fluctuate due to thermal energy of permanent magnetic layer 52.

Soft magnetic layer 54 may be formed of any soft magnetic material. For example, soft magnetic layer 54 may be formed of a binary NiFe alloy, such as permalloy (Fe:80Ni or Fe:78Ni); a ternary NiFeX (where X is another element) alloy, such as supermalloy (NiFeMo); mu-metal (NiFeCuCrMo); silicon iron (Fe:4Si); nickel, or the like. Soft magnetic layer 54 may be formed of a material and with a structure that causes soft magnetic layer 54 to have a sufficiently low coercivity at use temperatures of MRAM cell 20 so that the magnetic moment of soft magnetic layer 54 changes under influence of a magnetic field generated by permanent magnetic layer 52.

In some examples, the composition and configuration of permanent magnetic layer 52 and soft magnetic layer 54 may be selected so that soft magnetic layer 54 is near magnetic saturation when soft magnetic layer 54 is substantially intact (e.g., not damaged or in the state in which soft magnetic layer 54 was when soft magnetic layer 54 and permanent magnetic layer 52 were formed in MRAM die 10). When soft magnetic layer 54 is near magnetic saturation, the relative permeability of soft magnetic layer 54 may be near one (1), e.g., near the relative permeability of a non-magnetic material or a magnetically saturated magnetic material. For example, when soft magnetic layer 54 is near magnetic saturation, the relative permeability of soft magnetic layer 54 may be less than about 100 or less than about 10. Stated another way, when soft magnetic layer 54 is near magnetic saturation, the relative permeability of soft magnetic layer 54 may be much less than the relative permeability of an unsaturated soft magnetic material, e.g., much less than about 1,000.

When the permeability of soft magnetic layer 54 is near one, magnetic security structures 14 may not significantly interfere with operation of MRAM cell 20 when soft magnetic layer 54 is substantially intact, e.g., is not damaged. For example, when the permeability of soft magnetic layer 54 is near one, magnetic security structure 14 may not significantly interfere with writing of data to MRAM cell 20 by controlling orientation of the magnetic moment of free magnetic layer 28 using first write line 22 and second write line 24. In addition, when the permeability of soft magnetic layer 54 is near one, the magnetic flux propagating through magnetic security structure 14 may define a substantially flat (e.g., flat or nearly flat) hysteresis loop.

Hence, in normal operation, e.g., when soft magnetic layer 54 is substantially intact, magnetic security device 14 may not interfere with operation of MRAM cell 20. However, if soft magnetic layer 54 is damaged or removed, e.g., due to physical tampering with an MRAM die 10 of which MRAM cell 20 is a part, free magnetic layer 28 may be exposed to magnetic flux from permanent magnetic layer 52. For example, tampering with MRAM die 10 may result in physical changes to soft magnetic layer 54 that cause the hysteresis loop defined by the magnetic flux propagating from permanent magnetic layer 52 to soft magnetic layer 54 to change, thereby altering the affect the magnetic flux from permanent magnetic layer 52 has on adjacent structures, such as magnetic stack 26.

In some implementations, permanent magnetic layer 52 may have a magnetic field strength on the order of thousands of Oersetds (Oe). The saturation magnetization of soft magnetic layer 54 may be on the same order, so the thickness of soft magnetic layer 54 and permanent magnetic layer 52 may be approximately the same. In other example, the permittivity of soft magnetic layer 54 may result in soft magnetic layer 54 being thicker than permanent magnetic layer 52 in order that soft magnetic layer 54 may be near magnetic saturation. In some examples, permanent magnetic layer 52 may define a thickness, measured in the z-axis direction of FIG. 2A, of between about 1 nanometer (nm) and about 1 micrometer (μm). In some examples, soft magnetic layer 54 may define a thickness, measured in the z-axis direction of FIG. 2A, of between about 1 nm and about 1 millimeter (mm). In some examples, soft magnetic layer 54 is thicker than permanent magnetic layer 52. In other examples, soft magnetic layer 54 is thinner than permanent magnetic layer 52. In other examples, soft magnetic layer 54 is about the same thickness as permanent magnetic layer 52.

In some examples, the magnetic moment of permanent magnetic layer 52 may be configured (e.g., oriented relative to free magnetic layer 28 and sufficiently strong at the location of free magnetic layer 28) so that exposure of free magnetic layer 28 to magnetic flux from permanent magnetic layer 52 causes the magnetic moment of free magnetic layer 28 to be substantially aligned with the magnetic moment of permanent magnetic layer 52. For example, the magnetic moment of permanent magnetic layer 52 may be oriented in a direction parallel to first free magnetic moment 40 or a second free magnetic moment 42. When the orientation of the magnetic moment of free magnetic layer 28 prior to being exposed to magnetic flux from permanent magnetic layer 52 is different than the magnetic moment of permanent magnetic layer 52, exposure of free magnetic layer 28 to magnetic flux from permanent magnetic layer 52 may cause the magnetic moment of free magnetic layer 28 to change, thus changing the value of the bit stored by MRAM cell 20. On the other hand, when the orientation of the magnetic moment of free magnetic layer 28 prior to being exposed to magnetic flux from permanent magnetic layer 52 is substantially the same as the magnetic moment of permanent magnetic layer 52, exposure of free magnetic layer 28 to magnetic flux from permanent magnetic layer 52 may not cause the magnetic moment of free magnetic layer 28 to change.

When a plurality of MRAM cells 20 in an MRAM die 10 include at least one magnetic security structure 14 adjacent to the respective MRAM cells 20, the orientation of at least some of the magnetic moments in the respective free magnetic layers 28 will be changed upon damage to soft magnetic layer 54, rendering the data stored in the MRAM die 10 different than before tampering, which may effectively erase the data stored by MRAM die 10 in some examples. In some instances, the orientation of at least some of the magnetic moments in the respective magnetic free layers 28 will be changed within nanoseconds (e.g., less than 10 nanoseconds) of the soft magnetic layer 54 being tampered with. Changing the data stored by MRAM die 10 in response to tampering with magnetic security structure 14 may hinder access to the data and reverse engineering of the contents of the MRAM die 10. In this way, magnetic security structure 14 may help prevent tampering with the MRAM die 10 in which the structure 14 is incorporated, e.g., by helping to prevent access to data stored by the MRAM die 10.

Figure 3:
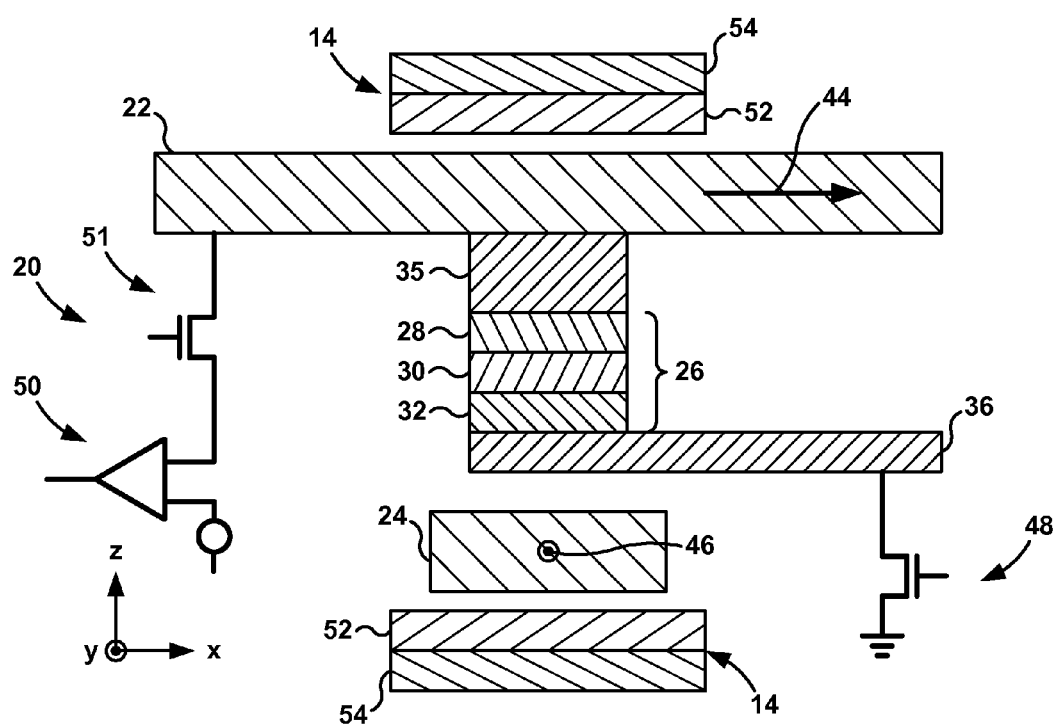
FIG. 3 is a conceptual cross-sectional diagram that illustrates an example MRAM cell and adjacent magnetic security structure.

FIGS. 2A-2C illustrate one example of a configuration of magnetic security structures 14 relative to MRAM cell 20. FIG. 3 is a conceptual and schematic cross-sectional diagram of another example configuration of MRAM cell 20. The configuration shown in FIG. 3 is similar to the configuration of MRAM cell 20 in FIG. 2A. However, unlike MRAM cell 20 shown in FIG. 2A, MRAM cell 14 shown in FIG. 3 does not include top electrode 34 directly connected to op-amp 50. Instead, a top electrode 35 is electrically connected between first write line 22 and magnetic stack 26. First write line 22 is then electrically connected to a transistor 51, which is electrically connected to op-amp 50. When writing to MRAM cell 20 (e.g., controlling an orientation of magnetic the free magnetic moment of free magnetic layer 28), transistor 52 and transistor 48 may be in an open state, such that op-amp 50 and magnetic stack 26 are substantially isolated from the current flowing through first write line 22. However, when reading the state of MRAM cell 20, the transistors 48 and 51 may be in closed states so current flows from a voltage source, through transistor 48, through bottom electrode 36, through magnetic stack 26, through first write line 22, through transistor 51, and to op-amp 50.

Figure 4:
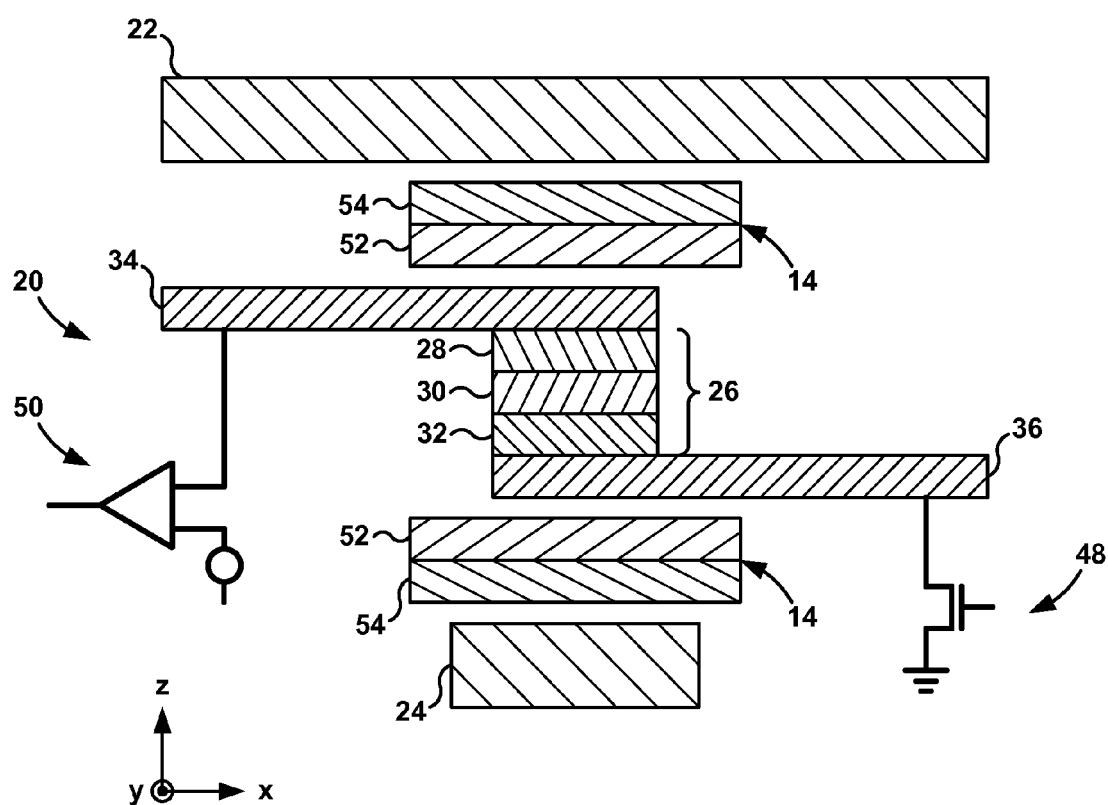
FIG. 4 is a conceptual cross-sectional diagram that illustrates an example MRAM cell and adjacent magnetic security structure

FIG. 4 illustrates another example configuration in which at least one magnetic security structure 14 is located adjacent to MRAM cell 20. In FIG. 4, a first magnetic security structure 14 is located between MRAM cell 20 and first write line 22 and a second magnetic security structure 14 is located between MRAM cell 20 and second write line 24. Magnetic security structures 14 and MRAM cell 20 are part of a common MRAM die 10. Similar to FIG. 2A, in some examples, the example illustrated in FIG. 4 may include only one magnetic security structure 14 instead of two magnetic security structures 14. Aside from the location of magnetic security structures 14 relative to MRAM cell 20, first write line 22, and second write line 24, the example illustrated in FIG. 4 may be substantially the same as the example illustrated in FIGS. 2A-2C.

As described above, in some implementations, the compositions and thicknesses of permanent magnetic layer 52 and soft magnetic layer 54 may be selected so soft magnetic layer 54 is near magnetic saturation when soft magnetic layer 54 is intact. Because the first magnetic security structure 14 is located between MRAM cell 20 and first write line 22 and the second magnetic security structure 14 is located between MRAM cell 20 and second write line 24, magnetic saturation of soft magnetic layer 54 may reduce or substantially eliminate interference between magnetic security structures 14 and the write process of free magnetic layer 28 (using first write line 22 and second write line 24).

In some examples, permanent magnetic layer 52 may define a thickness, measured in the z-axis direction of FIG. 4 (where orthogonal x-y-z axes are shown for purposes of illustration only), of between about 1 nm and about 1 μm. In some examples, soft magnetic layer 54 may define a thickness, measured in the z-axis direction of FIG. 4, of between about 1 nm and about 1 mm. In some implementations, permanent magnetic layer 52 may define a thickness between about 1 nm and about 100 nm. In some implementations, soft magnetic layer 54 may define a thickness between about 1 nm and about 10 μm. In some examples, soft magnetic layer 54 is thicker than permanent magnetic layer 52. In other examples, soft magnetic layer 54 is thinner than permanent magnetic layer 52. In other examples, soft magnetic layer 54 is about the same thickness as permanent magnetic layer 52.

Figure 5:
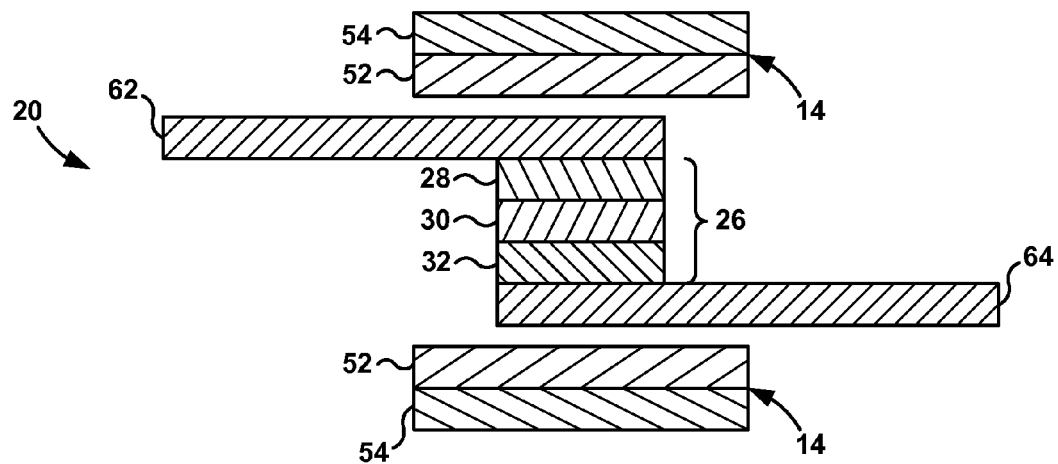
FIG. 5 is a conceptual cross-sectional diagram that illustrates an example MRAM cell and adjacent magnetic security structure.

FIG. 5 is a conceptual diagram that illustrates another example MRAM cell 20 and magnetic security structures 14 of an MRAM die 10. In the example illustrated in FIG. 5, MRAM cell 20 is a spin-transfer torque (STT)-MRAM cell. The magnetic moment of free magnetic layer 28 is oriented using spin-oriented current that is directed through magnetic stack 26 using first write line 62 and second write line 64. In some examples, first write line 62 and second write line 64 also serve as conduction paths for the process of reading data from MRAM cell 20 (e.g., measuring the resistance of magnetic stack 26). In other examples, MRAM cell 20 may include another conductive pathway electrically connected to magnetic stack for facilitating reading data from MRAM cell 20.

As shown in FIG. 5, a first magnetic security structure 14 may be located adjacent first write line 62 and a second magnetic security structure 14 may be located adjacent second write line 64. First write line 62 may be disposed between the first magnetic security structure 14 and MRAM cell 20 and second write line 64 may be disposed between the second magnetic security structure 14 and MRAM cell 20. As described above, in some examples, MRAM cell 20 may not have a first security structure 14 and a second security structure 14 located adjacent to cell 20, and may instead include a single magnetic security structure 14 (e.g., located adjacent first write line 62 or second write line 64). Magnetic security structures 14 may be similar to or substantially the same as magnetic security structures 14 described above.

Figure 6:
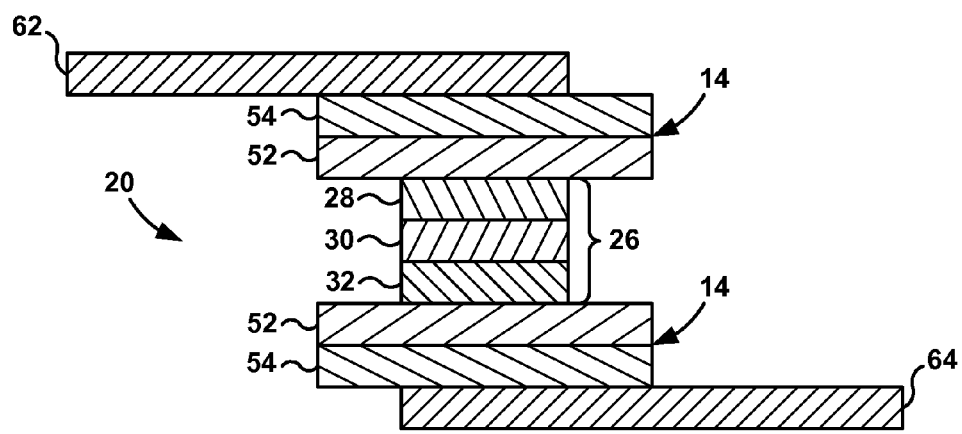
FIG. 6 is a conceptual cross-sectional diagram that illustrates an example MRAM cell and adjacent magnetic security structure.

FIG. 6 is a conceptual diagram that illustrates an additional example of an MRAM cell 20 and magnetic security structures 14 of a common MRAM die 10. In FIG. 6, a first magnetic security structure 14 is located between MRAM cell 20 and first write line 62 and a second magnetic security structure 14 is located between MRAM cell 20 and second write line 64. Similar to FIG. 5, in some examples, the example illustrated in FIG. 6 may include only one magnetic security structure 14 instead of two magnetic security structures 14. Aside from the location of magnetic security structures 14 relative to MRAM cell 20, first write line 62, and second write line 64, the example illustrated in FIG. 6 may be substantially the same as the example illustrated in FIG. 5.

As described above, in some implementations, the compositions and thicknesses of permanent magnetic layer 52 and soft magnetic layer 54 may be selected so soft magnetic layer 54 is near magnetic saturation when soft magnetic layer 54 is intact. Because the first magnetic security structure 14 is located between MRAM cell 20 and first write line 62 and the second magnetic security structure 14 is located between MRAM cell 20 and second write line 64, magnetic saturation of soft magnetic layer 54 may reduce or substantially eliminate interference between magnetic security structures 14 and the write process of free magnetic layer 28 (using first write line 62 and second write line 64).

The examples of magnetic security structures 14 thus far described include a permanent magnetic layer 52 and a soft magnetic layer 54. In other examples, a magnetic security structure 14 may include more than two layers, e.g., at least three layers. For example, as shown in the conceptual diagram of FIG. 7, a magnetic security structure 14 may include a first soft magnetic layer 72, a second soft magnetic layer 74, a spacer layer 76, a first permanent magnetic layer 78, and a second permanent magnetic layer 80.

First soft magnetic layer 72 and second soft magnetic layer 74 may be formed of soft magnetic materials, e.g., materials having a coercivity sufficiently low that a magnetic moment of first soft magnetic layer 72 and second soft magnetic layer 74 changes under the influence of the magnetic field generated by first permanent magnetic layer 78 and/or second permanent magnetic layer 80. In some examples, first soft magnetic layer 72 and second soft magnetic layer 74 may be formed of different materials, e.g., materials having a different chemical composition or a different crystal structure. In some implementations, first soft magnetic layer 72 and second soft magnetic layer 74 may define different thicknesses, while in other implementations, first soft magnetic layer 72 and second soft magnetic layer 74 may define similar thicknesses.

The compositions and thicknesses of first soft magnetic layer 72 and second soft magnetic layer 74 may be selected to provide desired properties to magnetic security structure 14. For example, the compositions and thicknesses of first soft magnetic layer 72 and second soft magnetic layer 74 may be selected so that first soft magnetic layer 72 and/or second soft magnetic layer 74 are near magnetic saturation (e.g., a permittivity of much less than about 1,000 or less than about 100 or less than about 10 or about 1) under influence of magnetic fields of first permanent magnetic layer 78 and second permanent magnetic layer 80, e.g., when the layers 72, 74, 76, and 78 are arranged in the manner shown in FIG. 7. As another example, use of multiple soft magnetic layers, e.g., first soft magnetic layer 72 and second soft magnetic layer 74, may allow more control of the thickness of magnetic security structure 14 compared to a structure 14 that includes one soft magnetic layer. Multiple soft magnetic layers, e.g., first soft magnetic layer 72 and second soft magnetic layer 74, also may allow tailoring of the response of magnetic security structure 14 to attempted tampering, e.g., attempted removal. For example, first soft magnetic layer 72 may be configured to be relatively easily removable from magnetic security structure 14 compared to second soft magnetic layer 74.

Additionally or alternatively, different magnetic security structures 14 within an MRAM die 10 may include different compositions, or thicknesses, or both, of first soft magnetic layer 72 and second soft magnetic layer 74. Some magnetic security structures 14 may include first soft magnetic layer 72 and second soft magnetic layer 74, while other magnetic security structures within the same MRAM die 10 may include only first soft magnetic layer 72. Variation of the thickness and/or composition of first soft magnetic layer 72 and/or second soft magnetic layer 74 among different MRAM cells 12 may complication tampering with MRAM die 10, as an unauthorized user, e.g., a tamperer, may be less likely to know the configuration of magnetic security structure 14, and thus may be more likely to attempt to remove one or more magnetic security structure 14 in a way that changes a magnetic state of one or more MRAM cells 12.

Spacer layer 76 may be formed of any of a wide range of materials, including substantially nonmagnetic materials. For example, spacer layer 76 may include aluminum, copper, another non-magnetic metal, silicon dioxide ($SiO_2$), silicon nitride (e.g., SiN, $Si_3N_4$, or $Si_2N_3$), aluminum oxide ($Al_2O_3$), another oxide or nitride, or the like. Spacer layer 76 may provide distance between second soft magnetic layer 74 and first permanent magnetic layer 78, which may affect magnetic properties of magnetic security structure 14. In this way, including spacer layer 76 or not including spacer layer 76 may result in magnetic security structures 14 with different magnetic properties. In addition, spacer layer 76 may add geometric variety to magnetic security structure 14 that may further complicate tampering with MRAM die 10 including the magnetic security structure 14. For example, adding spacer layer 76 and changing the number, size and arrangement of spacer layers 76 in different magnetic security structures 14 may help reduce the predictability of the type of magnetic security structure 14 in a particular MRAM die 10, which may reduce the possibility of successful tampering with MRAM die 10 (e.g., removing magnetic security structures 14 without changing the magnetic field of free layer 28 in any of the MRAM cells 12).

Figure 7:
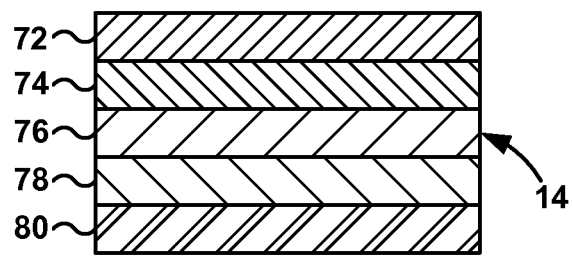
FIG. 7 is a conceptual cross-sectional diagram that illustrates an example magnetic security structure.

Although not shown in FIG. 7, in some examples, a spacer layer may be provided between first soft magnetic layer 72 and second soft magnetic layer 74 and/or between first permanent magnetic layer 78 and second permanent magnetic layer 80.

First permanent magnetic layer 78 and second permanent magnetic layer 80 may be formed of hard magnetic materials, e.g., materials having a sufficiently high coercivity that magnetic moments of first permanent magnetic layer 78 and second permanent magnetic layer 80 are substantially stable at temperature at which magnetic security structure 14 is used. In some examples, first permanent magnetic layer 78 and second permanent magnetic layer 80 may be formed of different materials, e.g., materials having a different chemical composition or a different crystal structure. In some implementations, first permanent magnetic layer 78 and second permanent magnetic layer 80 may define different thicknesses, while in other implementations, first permanent magnetic layer 78 and second permanent magnetic layer 80 may define similar thicknesses.

The compositions and thicknesses of first permanent magnetic layer 78 and second permanent magnetic layer 80 may be selected to provide desired properties to magnetic security structure 14. For example, the compositions and thicknesses of first permanent magnetic layer 78 and second permanent magnetic layer 80 may be selected so that first soft magnetic layer 72 and/or second soft magnetic layer 74 are near magnetic saturation (e.g., a permittivity of much less than about 1,000 or less than about 100 or less than about 10 or about 1) under influence of magnetic fields of first permanent magnetic layer 78 and second permanent magnetic layer 80.

As another example, use of multiple permanent magnetic layers, e.g., first permanent magnetic layer 78 and second permanent magnetic layer 80, may allow more control of the thickness of magnetic security structure 14 compared to a structure 14 that includes one permanent magnetic layer. Multiple permanent magnetic layers, e.g., first permanent magnetic layer 78 and second permanent magnetic layer 80, also may allow tailoring of the response of magnetic security structure 14 to attempted tampering, e.g., attempted removal. For example, first permanent magnetic layer 78 may be configured to be relatively easily removable from magnetic security structure 14 compared to second permanent magnetic layer 80.

Additionally or alternatively, different magnetic security structures 14 within an MRAM die 10 may include different compositions, or thicknesses, or both, of first permanent magnetic layer 78 and second permanent magnetic layer 80. Some magnetic security structures 14 may include first permanent magnetic layer 78 and second permanent magnetic layer 80, while other magnetic security structures within the same MRAM die 10 may include only first permanent magnetic layer 78. Variation of the thickness and/or composition of first permanent magnetic layer 78 and/or second permanent magnetic layer 80 among different MRAM cells 12 may complication tampering with MRAM die 10, as an unauthorized user, e.g., a tamperer, may be less likely to know the configuration of magnetic security structure 14, and thus may be more likely to attempt to remove one or more magnetic security structure 14 in a way that changes a magnetic state of one or more MRAM cells 12.

Figure 8:
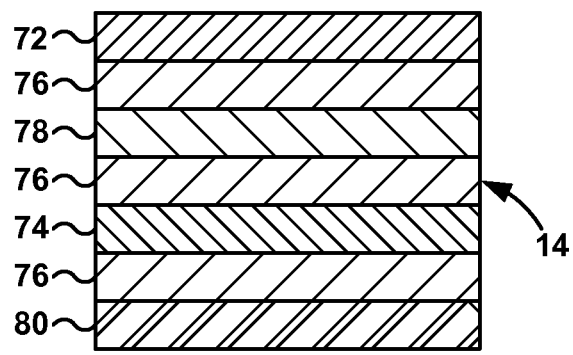
FIG. 8 is a conceptual cross-sectional diagram that illustrates an example magnetic security structure.

In other examples, as shown in the conceptual diagram of FIG. 8, a magnetic security structure 14 may include a plurality of layers (e.g., at least three layers) in which permanent magnetic layers are interleaved with soft magnetic layers. For example, FIG. 8 illustrates first permanent magnetic layer 78 disposed between first soft magnetic layer 72 and second soft magnetic layer 74, and second soft magnetic layer 74 disposed between first permanent magnetic layer 78 and second permanent magnetic layer 80. In other words, first soft magnetic layer 72 is disposed above first permanent magnetic layer 78, which is disposed above second soft magnetic layer 74, which is disposed above second permanent magnetic layer 80. Magnetic security structure 14 illustrated in FIG. 8 also includes spacer layer 76 between each adjacent magnetic layer 72, 74, 78, 80. In other examples, a magnetic security structure 14 may include spacer layers 76 between only some of magnetic layers 72, 74, 78, 80 or may not include a spacer layer 76 between any adjacent pairs of magnetic layers 72, 74, 78, 80.

Figure 9:
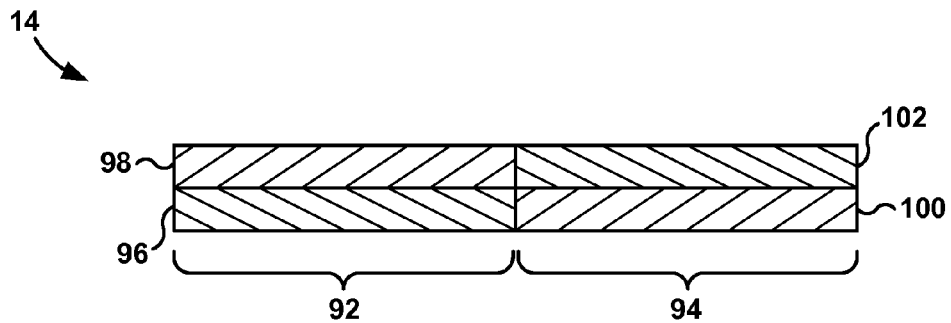
FIG. 9 is a conceptual cross-sectional diagram that illustrates an example magnetic security structure.

FIG. 9 is a conceptual cross-sectional diagram that illustrates an example magnetic security structure 14 that includes a first structural configuration 92 in a first portion of magnetic security structure 14 and a second, different structural configuration 94 in a second portion of magnetic security structure 14. In the example shown in FIG. 9, the first structural configuration 92 includes a first soft magnetic layer 96 and a first permanent magnetic layer 98. The second structural configuration 94 includes a second permanent magnetic layer 100 and a second permanent magnetic layer 102. Permanent magnetic layers 98 and 100 may include compositions and/or thicknesses similar to permanent magnetic layer 52 shown in FIGS. 2A, 3, 4, 5, and 6. Permanent magnetic layers 98 and 100 may include similar or different compositions and/or thicknesses. Similarly, soft magnetic layers 96 and 102 may include compositions and/or thicknesses similar to soft magnetic layer 54 shown in FIGS. 2A, 3, 4, 5, and 6. Soft magnetic layers 96 and 102 may include similar or different compositions and/or thicknesses.

In some implementations, a magnetic security structure 14 that includes at least two structural configurations may hinder tampering with an MRAM die (e.g., MRAM die 10a of FIG. 1) in which magnetic security structure 14 is used. For example, an intruder attempting to tamper with the MRAM package may not realize that at least two structural configurations are used in the magnetic security structure 14 and may inadvertently damage the soft magnetic layer (e.g., first soft magnetic layer 102) in at least one portion of magnetic security structure 14 because the intruder is unaware of the different location of the soft magnetic layer within magnetic security structure 14. In this way a magnetic security structure 14 may increase a likelihood that the tampering results in at least some of the data stored in the MRAM die is modified before the intruder can access the data stored in the MRAM die.

In some examples, different configurations (e.g., as shown in FIGS. 2A, 7, 8, and 9) of magnetic security structures 14 may be used adjacent to different MRAM cells 20. For example, one configuration of a magnetic security structure 14 may be used adjacent to some MRAM cells 20 and a second configuration of magnetic security structure 14 may be used adjacent to other MRAM cells 20. Variation of magnetic security structures 14 throughout an MRAM die 10 (FIGS. 1A-1E) may make successful tampering with an MRAM die 10 more difficult by providing variation in the disassembly process that must be used to remove the magnetic security structures 14 from MRAM die 10 without affecting MRAM cells 20 (e.g., the orientation of the magnetic moment of free magnetic layer 28) to recover data stored by MRAM cells 20. In this way, variation in the configuration of magnetic security structures 14 in an MRAM die 10 may make it less predictable for an adversary to determine the process that must be used to successfully remove magnetic security structure 14 from the die 10 without affecting the magnetic moment of an adjacent free magnetic layer 28.

For example, some magnetic security structures 14 may include a spacer layer 76 and some magnetic security structures 14 may not include a spacer layer 76. A process that may successfully remove one magnetic security structure 14 that does not include a spacer layer 76 (e.g., without affecting the magnetic moment of an adjacent free magnetic layer 28) may not be successful in completely removing magnetic security structure 14 with a spacer layer 14 without affecting the magnetic moment of an adjacent free magnetic layer 28). As another example, some magnetic security structures 14 may have a configuration in which permanent magnetic layer 52 is located closer to a MRAM cell 20 than soft magnetic layer 54 (as shown in FIG. 2A, for example) and other magnetic security structures 14 may have a configuration in which soft magnetic layer 54 is located closer to a MRAM cell 20 than permanent magnetic layer 52. If the magnetic security structures 14 are adjacent to each other, such that one layer of the die 10 (e.g., one plane) includes a permanent magnetic layer 52 of one magnetic security structure 14 and a soft magnetic layer 54 of another magnetic security structure 14, an adversary may not successfully remove just the permanent magnetic layer 52 of one magnetic security structure 14 by removing the layer of the die that includes the permanent magnetic layer 52 without inadvertently removing the soft magnetic layer 54 of the adjacent security structure 14. As discussed above, removal or physical damage to the soft magnetic layer 54 may cause bits of the MRAM die 10 to be rewritten.

Any combination of magnetic security structures 14 and/or MRAM cells 20 described herein may be utilized together in any combination within the scope of this disclosure.

Figure 10:
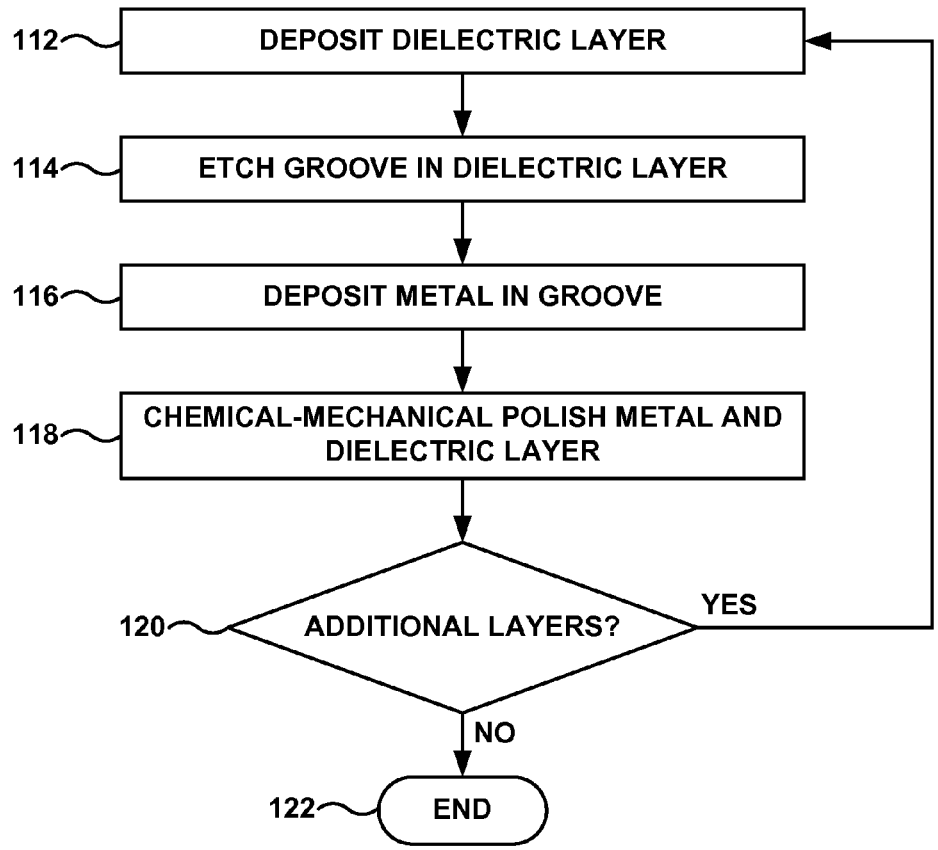
FIG. 10 is a flow diagram of an example technique that may be implemented to form an MRAM cell that includes magnetic security structures.

Magnetic security structures 14 may be incorporated into MRAM die 10 and may be formed as part of the semiconductor processing that forms MRAM die 10. For example, magnetic security structures 14 may be formed in MRAM die 10 during back-end-of-line (BEOL) processing when the magnetic stack 26, interconnects (e.g., first write line 22 and second write line 24 or first write line 62 and second write line 64), and dielectric layers are formed. For example, magnetic stack 26, interconnects (e.g., first write line 22 and second write line 24 or first write line 62 and second write line 64), and surrounding dielectric layers may be formed using an additive process, such as a Damascene process or a dual Damascene process, or a subtractive process, such as subtractive aluminizing. FIG. 10 is a flow diagram that illustrates an example Damascene process for forming the dielectric, first write line 62, second write line 64, fixed magnetic layer 32, tunnel barrier layer 30, and free magnetic layer 28.

The technique shown in FIG. 10 includes depositing a dielectric layer (112), etching a groove in the dielectric layer (114), depositing a predetermined material in the groove to form a predetermined structure (116), and chemical mechanical polishing (CMP) the predetermined material and the dielectric layer to form a substantially planar surface (118). This process may be repeated for each additional layer of material in the structure, e.g., in the magnetic stack 26 (see decision block (120)). An example of the technique shown in FIG. 10 will be described with reference to FIG. 11. However, the technique shown in FIG. 10 may be extended or modified to produce MRAM dice 10 having configuration other than that shown in FIG. 11.

Figure 11:
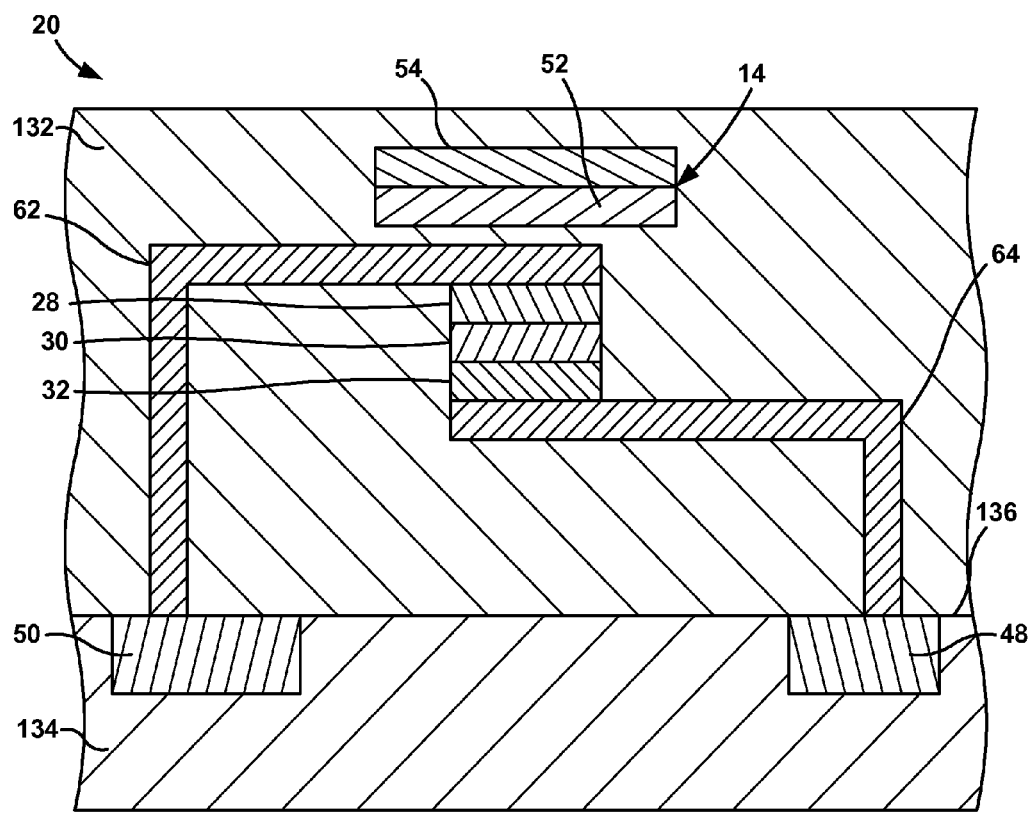
FIG. 11 is a conceptual cross-sectional diagram of an example MRAM cell and adjacent magnetic security structure.

In an example for forming the MRAM cell 20 of FIG. 11, the technique of FIG. 10 may include depositing a first dielectric layer on a surface 136 of a semiconductor substrate 134 (112). The first dielectric layer may be formed to a predetermined thickness, which may be based on, for example, requirements for electrical isolation between the transistors (e.g., transistor 48) and the interconnect or electrode to be formed on and through the dielectric layer (e.g., second write line 64). The first dielectric layer may be formed using any suitable process, including, for example, chemical vapor deposition (CVD) or spin coating. The dielectric layer may include, for example, SiO$_2$, SiOC, silicate glass, or the like.

Once the first dielectric layer has been formed (112), the first dielectric layer is masked to define a shape of a groove that corresponds to a desired shape of an electrode (e.g., a portion of first write line 62 and second write line 64). The groove then is etched in the first dielectric layer (114). The groove may include substantially vertical (e.g., vertical or nearly vertical) portions and/or a substantially horizontal (e.g., horizontal or nearly horizontal) portions. In some examples, the masking and etching may define at least two grooves (e.g., one groove for first write line 62 and a second groove for second write line 64). In some examples, the masking and etching may occur in two steps to define the substantially vertical portions and the substantially horizontal portion of the groove (e.g., the groove for second write line 64).

The groove may be etched using an etchant that selectively etches oxides but does not etch silicon, which may help prevent damage to the transistors (e.g., transistor 48 and/or op-amp 50). For example, the groove may be etched using buffered hydrofluoric acid (BHF; a mixture of a buffering agent such as ammonium fluoride (NH$_4$F) and hydrofluoric acid (HF)) or dry plasma etching techniques.

After the groove has been etched in the first dielectric layer, a predetermined material is deposited in the groove (116). When the groove defines a position of an electrode (e.g., first write line 62 or second write line 64), the predetermined material includes an electrically conductive material, such as copper. In some examples, excess material is deposited in the groove such that the material overflows the groove and some material is disposed on a surface of the first dielectric layer. The predetermined material may be deposited in the groove using any suitable process, including, for example, CVD and/or electroplating.

Once the predetermined material has been deposited in the groove (116), the excess material is removed and a substantially planar (e.g., planar or nearly planar) surface of the copper and the first dielectric layer is formed using chemical mechanical polishing (CMP) (118).

Because the MRAM cell 20 includes additional layers of material (120), the process repeats. A second dielectric layer is deposited over the first dielectric layer and the groove(s) filled with the predetermined material (112). A shape of at least one groove is then masked on the second dielectric layer, and the groove is etched in the second dielectric layer (114). For example, a first groove corresponding to the shape of first write line 62 and a second groove corresponding to a shape of fixed magnetic layer 32 may be etched in the second dielectric layer (114). The grooves are then filled with the corresponding predetermined materials (116), e.g., an electrically conductive material in the groove for the first write line 62 and a ferromagnetic material in the groove for fixed magnetic layer 32. The predetermined materials and the second dielectric layer then may be polished using CMP to form a substantially planar surface (118).

This process may be repeated for the tunnel barrier layer 30, the free magnetic layer 28, and the first write line 62. The process is also repeated to form permanent magnetic layer 52 and soft magnetic layer 54. Once no more layers are to be formed (the "NO" branch of decision block (120), the process ends (122). As described above, incorporating the magnetic security structure into the MRAM die 10 adjacent to MRAM cell 12 may complicate removal of the magnetic security structure from the MRAM die 10 without affecting data stored by the MRAM die 10, e.g., compared to a magnetic security structure that is separate from the MRAM die 10.

Various examples have been described. These and other examples are within the scope of the following claims.

What is claimed is:

1. A magnetoresistive random access memory (MRAM) die comprising:
   a first write line;
   a second write line;
   an MRAM cell disposed between the first write line and the second write line, wherein the MRAM cell comprises a free magnetic layer; and
   a magnetic security structure adjacent to the MRAM cell, wherein the magnetic security structure comprises a permanent magnetic layer and a soft magnetic layer, and wherein the permanent magnetic layer is configured relative to the free magnetic layer so that the free magnetic layer is exposed to magnetic flux from the permanent magnetic layer when the soft magnetic layer is damaged.

2. The MRAM die of claim 1, wherein the magnetic security structure is disposed between the first write line and the MRAM cell.

3. The MRAM die of claim 1, wherein the first write line is disposed between the MRAM cell and the magnetic security structure.

4. The MRAM die of claim 1, wherein the permanent magnetic layer and the soft magnetic layer are configured so that the soft magnetic layer has a relative magnetic permeability of less than about 10 when the soft magnetic layer is substantially intact.

5. The MRAM die of claim 4, wherein the permanent magnetic layer and the soft magnetic layer are configured so that the soft magnetic layer has a magnetic permeability of about 1 when the soft magnetic layer is substantially intact.

6. The MRAM die of claim 1, wherein the permanent magnetic layer is disposed between the soft magnetic layer and the MRAM cell.

7. The MRAM die of claim 1, wherein the soft magnetic layer is disposed between the permanent magnetic layer and the MRAM cell.

8. The MRAM die of claim 1, wherein the magnetic security structure further comprises a spacer layer between the permanent magnetic layer and the soft magnetic layer.

9. The MRAM die of claim 1, wherein the permanent magnetic layer comprises a first permanent magnetic layer, wherein the soft magnetic layer comprises a first soft magnetic layer, and wherein the magnetic security structure further comprises a second permanent magnetic layer and a second soft magnetic layer.

10. A magnetoresistive random access memory (MRAM) die comprising:
   a plurality of MRAM cells, wherein each of the MRAM cells comprises:
      a free magnetic layer,
      a fixed magnetic layer, and
      a tunnel barrier layer disposed between the free magnetic layer and the fixed magnetic layer; and
   a magnetic security structure adjacent to at least one MRAM cell of the plurality of MRAM cells, wherein the magnetic security structure comprises a permanent magnetic layer and a soft magnetic layer, wherein the permanent magnetic layer is configured relative to the free magnetic layer of the at least one MRAM cell so that the free magnetic layer is exposed to magnetic flux from the permanent magnetic layer when the soft magnetic layer is damaged.

11. The MRAM die of claim 10, wherein the magnetic security structure extends adjacent to at least two MRAM cells of the plurality of MRAM cells.

12. The MRAM die of claim 10, wherein at least one MRAM cell of the plurality of MRAM cells is not adjacent to the magnetic security structure.

13. The MRAM die of claim 10, further comprising a write line, wherein the magnetic security structure is disposed between the write line and the at least one MRAM cell of the plurality of MRAM cells.

14. The MRAM die of claim 10, further comprising a write line, wherein the write line is disposed between the at least one MRAM cell of the plurality of MRAM cells and the magnetic security structure.

15. The MRAM die of claim 10, wherein the permanent magnetic layer and the soft magnetic layer are configured so that the soft magnetic layer has a magnetic permeability of less than about 10 when the soft magnetic layer is substantially intact.

16. The MRAM die of claim 10, wherein the magnetic security structure comprises a first magnetic security structure, wherein the at least one MRAM cell comprises a set of MRAM cells from the plurality of MRAM cells, further comprising a second magnetic security structure adjacent to a second set of MRAM cells from the plurality of MRAM cells, wherein the first magnetic security structure and the second magnetic security structure comprise different configurations.

17. A method comprising:
   forming a magnetoresistive random access memory (MRAM) cell comprising a magnetic stack comprising a fixed magnetic layer, a tunnel barrier layer, and a free magnetic layer in a MRAM die; and
   forming, in the MRAM die, a magnetic security structure adjacent to the MRAM cell, wherein the magnetic security structure comprises a permanent magnetic layer and a soft magnetic layer, wherein the permanent magnetic layer is configured relative to the free magnetic layer so that the free magnetic layer is exposed to magnetic flux from the permanent magnetic layer when the soft magnetic layer is damaged.

18. The method of claim 17, wherein forming, in the MRAM die, the magnetic security structure adjacent to the MRAM cell comprises forming the magnetic security structure between the magnetic stack and a write line.

19. The method of claim 17, wherein forming, in the MRAM die, the magnetic security structure adjacent to the MRAM cell comprises forming the magnetic security structure on an opposite side of a write line from the magnetic stack.

20. The method of claim 17, wherein forming, in the MRAM die, the magnetic security structure adjacent to the MRAM cell comprises forming the magnetic security structure so that the soft magnetic layer has a magnetic permeability of less than about 10 when the soft magnetic layer is substantially intact.

\* \* \* \* \*